(12) United States Patent
Pease et al.

(10) Patent No.: US 12,254,579 B2
(45) Date of Patent: Mar. 18, 2025

(54) SPATIAL VIDEO CAPTURE AND REPLAY

(71) Applicant: APPLE INC., Cupertino, CA (US)

(72) Inventors: Timothy R. Pease, Emerald Hills, CA (US); Alexandre Da Veiga, San Francisco, CA (US); Benjamin H. Boesel, Sunnyvale, CA (US); David H. Huang, San Mateo, CA (US); Jonathan Perron, Felton, CA (US); Shih-Sang Chiu, Menlo Park, CA (US); Spencer H. Ray, San Jose, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 17/984,282

(22) Filed: Nov. 10, 2022

(65) Prior Publication Data

US 2023/0281933 A1 Sep. 7, 2023

Related U.S. Application Data

(63) Continuation of application No. PCT/US2021/030560, filed on May 4, 2021.

(60) Provisional application No. 63/023,963, filed on May 13, 2020.

(51) Int. Cl.
*G06T 17/00* (2006.01)
*G06T 7/30* (2017.01)
(Continued)

(52) U.S. Cl.
CPC .............. *G06T 19/006* (2013.01); *G06T 7/30* (2017.01); *G06T 7/579* (2017.01); *G06T 7/70* (2017.01);
(Continued)

(58) Field of Classification Search
None
See application file for complete search history.

(56) References Cited

U.S. PATENT DOCUMENTS 9,124,874 B2 9/2015 Chen et al.
9,438,878 B2 9/2016 Niebla, Jr. et al.
(Continued)

OTHER PUBLICATIONS

European Patent Office (ISA/EP), International Search Report and Written Opinion of the International Searching Authority, International Application No. PCT/US2021/030560, 13 pages, Jul. 21, 2021.

*Primary Examiner* — Joni Hsu
(74) *Attorney, Agent, or Firm* — Thompson Hine LLP

(57) ABSTRACT

Various implementations disclosed herein include devices, systems, and methods that create a 3D video that includes determining first adjustments (e.g., first transforms) to video frames (e.g., one or more RGB images and depth images per frame) to align content in a coordinate system to remove the effects of capturing camera motion. Various implementations disclosed herein include devices, systems, and methods that playback a 3D video and includes determining second adjustments (e.g., second transforms) to remove the effects of movement of a viewing electronic device relative to a viewing environment during playback of the 3D video. Some implementations distinguish static content and moving content of the video frames to playback only moving objects or facilitate concurrent playback of multiple spatially related 3D videos. The 3D video may include images, audio, or 3D video of a video-capture-device user.

21 Claims, 10 Drawing Sheets

(51) Int. Cl.
  *G06T 7/579* (2017.01)
  *G06T 7/70* (2017.01)
  *G06T 19/00* (2011.01)

(52) U.S. Cl.
  CPC .......... *G06T 17/00* (2013.01); *G06T 2200/04* (2013.01); *G06T 2200/08* (2013.01); *G06T 2207/10016* (2013.01); *G06T 2207/10024* (2013.01); *G06T 2207/10028* (2013.01); *G06T 2207/20021* (2013.01); *G06T 2210/56* (2013.01)

(56) References Cited

U.S. PATENT DOCUMENTS

| | | | |
|---|---|---|---|
| 9,773,313 B1* | 9/2017 | Klingner | G06T 7/50 |
| 10,154,242 B1 | 12/2018 | Fan | |
| 10,250,868 B1* | 4/2019 | Arnold | G11B 27/19 |
| 10,448,012 B2* | 10/2019 | Hensler | H04N 19/162 |
| 10,482,679 B2 | 11/2019 | Bell et al. | |
| 11,567,497 B1* | 1/2023 | Foster | G01S 17/89 |
| 2013/0083173 A1* | 4/2013 | Geisner | G06T 19/006 |
| | | | 348/51 |
| 2014/0225985 A1 | 8/2014 | Klusza et al. | |
| 2015/0035820 A1* | 2/2015 | Le | G06T 17/00 |
| | | | 345/419 |
| 2016/0361658 A1* | 12/2016 | Osman | A63F 13/26 |
| 2019/0304170 A1 | 10/2019 | Meilland | |
| 2020/0304773 A1* | 9/2020 | Tomkevicius | H04N 13/128 |
| 2020/0312011 A1* | 10/2020 | Kopeinigg | G06T 19/006 |
| 2021/0211819 A1* | 7/2021 | Valerio Parise | H04R 1/323 |
| 2021/0279768 A1* | 9/2021 | Xu | G06T 19/006 |

\* cited by examiner

SPATIAL VIDEO CAPTURE AND REPLAY

CROSS-REFERENCE TO RELATED APPLICATIONS

This patent application is a continuation of International Application No. PCT/US2021/030560 filed May 4, 2021, which claims the benefit of U.S. Provisional Application No. 63/023,963 filed on May 13, 2020, entitled "SPATIAL VIDEO CAPTURE AND REPLAY," each of which is incorporated herein by this reference in its entirety.

TECHNICAL FIELD

The present disclosure generally relates to systems, methods, and devices for capturing three-dimensional (3D) videos or playback of 3D video content.

BACKGROUND

Image and depth sensor data combined with modeling is being used to generate 3D representations of an environment. The 3D information may be recorded over time to create 3D video content. However, existing technologies for capturing, storing, and playing back such 3D video content have various deficiencies.

SUMMARY

Various implementations disclosed herein include devices, systems, and methods that generate 3D videos. In some implementations, adjustments (e.g., transforms) are determined to align content represented in the 3D video in a coordinate system to reduce effects of motion of sensors during the capturing of the content (e.g., a sequence of images and depth data) for the 3D video. For example, video frames of the 3D video may be aligned so that a static object (e.g., a couch) is at the same coordinates even though a camera used to create the 3D video moved from frame to frame. In some implementations, static content and moving content are distinguished for video frames for rendering only moving objects in video frames. In some implementations, static content and moving content are distinguished for video frames to facilitate creation of multiple spatially related 3D videos (e.g., wedding scenario). In some implementations, the 3D video may include images, spatialized audio, or 3D video of a video-capture-device user.

Various implementations disclosed herein include devices, systems, and methods that create a 3D video (e.g., for use in an extended reality (XR) environment). In some implementations, at an electronic device having a processor, a sequence of images and depth data of a physical environment is obtained via sensors. In some implementations, based on movement of the sensors, adjustments are determined to align content represented in the sequence of images and depth data in a coordinate system to reduce effects of motion of the sensors during the capturing. In some implementations, a 3D video is generated including the sequence of images, depth data, and the adjustments.

Various implementations disclosed herein include devices, systems, and methods that playback 3D video. In some implementations, first adjustments (e.g., transforms) are determined to align content represented in the 3D video in a coordinate system to reduce effects of motion of sensors during the capturing of the content (e.g., capturing a sequence of images and depth data) for the 3D video. For example, video frames of the 3D video may be aligned so that a static object (e.g., a couch) is at the same coordinates even though a camera used to create the 3D video moved from frame to frame. In some implementations, second adjustments (e.g., second transforms) are determined to remove the effects of movement of the viewing electronic device relative to the 3D video during playback. Some implementations distinguish static content and moving content of video frames to playback only moving objects. Some implementations distinguish static content and moving content of video frames to facilitate concurrent playback of multiple spatially related 3D videos. In some implementations, the playing 3D video may include images, spatialized audio, or 3D video of a video-capture-device user.

Various implementations disclosed herein include devices, systems, and methods that playback a 3D video (e.g., in a XR environment). In some implementations, at an electronic device having a processor, a 3D video is obtained including images, depth data, and sensor metadata. In some implementations, first adjustments are determined to align content represented in the images and depth data, the first adjustments accounting for movement of a device that captured the images and depth data based on the sensor metadata. In some implementations, second adjustments are determined to align the content represented in the images and depth data in a XR environment provided relative to a viewing electronic device, the second adjustments accounting for movement of the viewing electronic device during presentation of the XR environment. In some implementations, the 3D video is played in the XR environment based on the first adjustments and the second adjustments.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
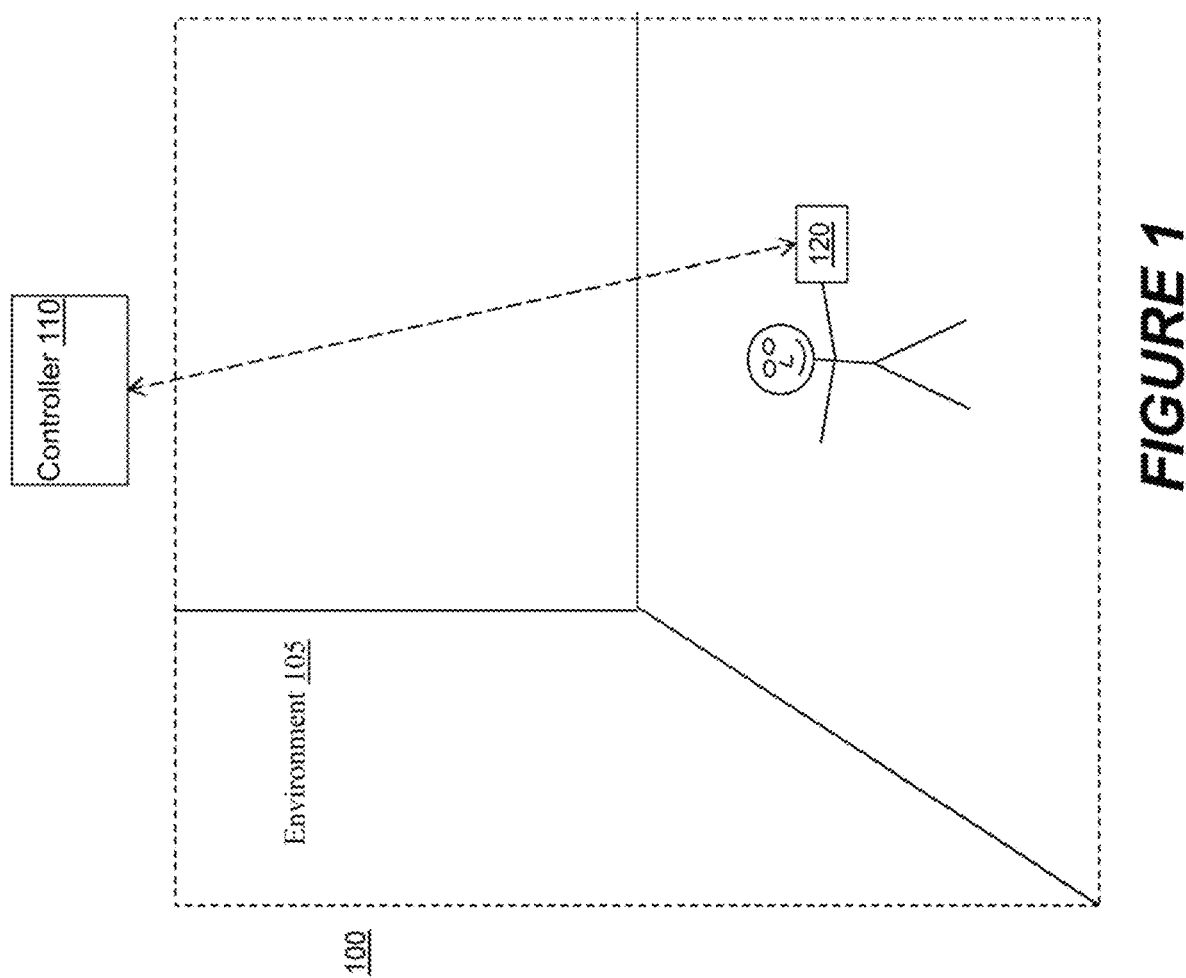
FIG. 1 is a block diagram showing an example system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
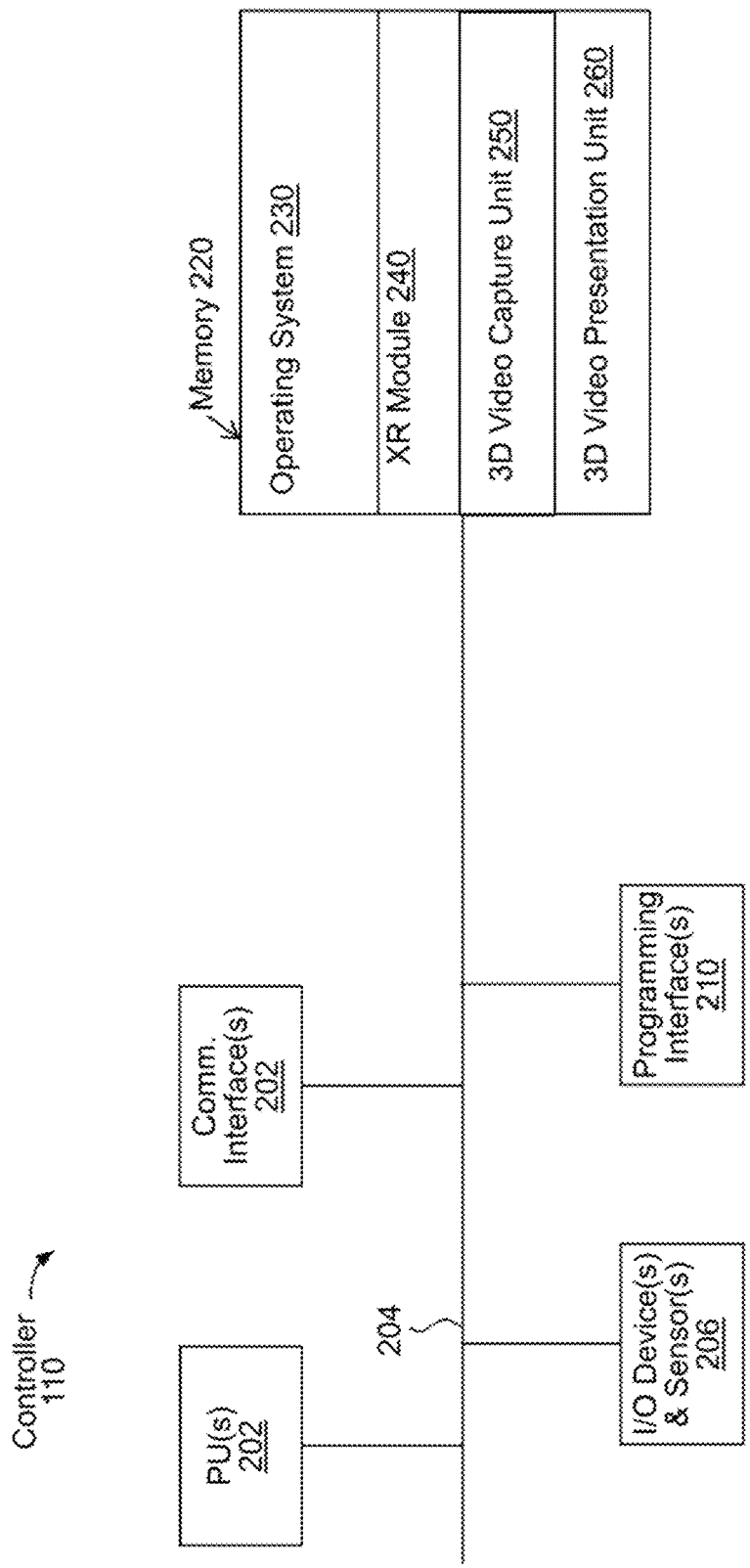
FIG. 2 is a block diagram showing an example controller, in accordance with some implementations.
Figure 3:
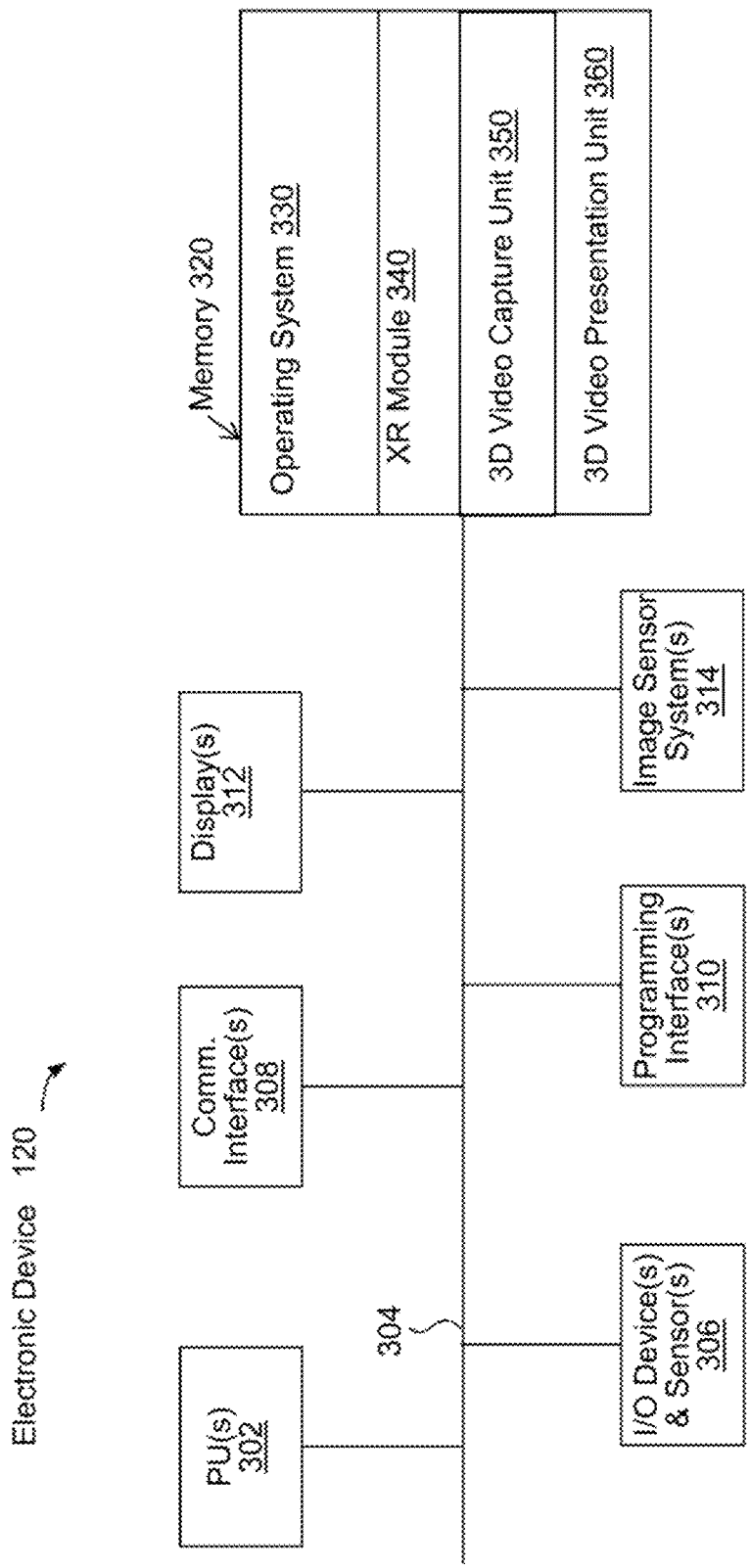
FIG. 3 is a block diagram showing an example electronic device, in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving electronic devices including, but not limited to, watches and other wearable electronic devices, mobile devices, laptops, desktops, HMDs, gaming devices, home automation devices, accessory devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device (e.g., laptop) 120, one or all of which may be in a physical environment 105. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a XR environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with a corresponding electronic device 120 via one or more wired or wireless communication channels 144 (e.g., BLUETOOTH, IEEE 802.11x, IEEE 802.16x, IEEE 802.3x, etc.).

In some implementations, the controller 110 and a corresponding electronic device (e.g., 120) are configured to present the XR environment to the user together.

In some implementations, the electronic device 120 is configured to present the XR environment to the user. In some implementations, the electronic device 120 includes a suitable combination of software, firmware, or hardware. The electronic device 120 is described in greater detail below with respect to FIG. 3. In some implementations, the functionalities of the corresponding controller 110 is provided by or combined with the electronic device 120, for example, in the case of an electronic device that functions as a stand-alone unit.

According to some implementations, the electronic device 120 presents a XR environment to the user while the user is present within the physical environment 105. An extended reality (XR) environment refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

FIG. 2 is a block diagram of an example of a controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a XR module 240, a 3D video capture unit 250, and a 3D video presentation unit 260.

The operating system 230 includes procedures for handling various basic system services and for performing hardware dependent tasks.

In some implementations, the XR module 240 is configured to create, edit, present, or experience XR environments. The XR module 240 is configured to present virtual content that will be used as part of XR environments for one or more users. For example, the user may view and otherwise experience a XR-based user interface that allows the user to select, place, move, and otherwise present a XR environment, for example, based on the virtual content location via hand gestures, voice commands, input device inputs, etc.

In some implementations, the 3D video capture unit 250 is configured to capture or generate 3D videos from a physical environment or in a XR environment. In some implementations, the 3D video capture unit 250 is configured to capture 3D videos independent of capture device movement, with actual size, or with determined relationships to positional references in the physical environment.

In some implementations, the 3D video presentation unit 260 is configured to render obtained 3D videos in a XR environment. In some implementations, the 3D video presentation unit 260 is configured to view 3D videos independent of the viewing device movement, based on at actual size, or with determined relationships to positional references in the XR environment. Although these modules and units are shown as residing on a single device (e.g., the controller 110), it should be understood that in other implementations, any combination of these modules and units may be located in separate computing devices.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of an electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a XR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 312 correspond to diffractive, reflective, polarized, holographic, etc. waveguide displays. For example, the electronic device may include a single display. In another example, the electronic device may include a display for each eye of the user.

In some implementations, the one or more interior or exterior facing sensor systems 314 include an image capture device or array that captures image data or an audio capture device or array (e.g., microphone) that captures audio data. In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 314 further include illumination sources that emit light (e.g., upon a subject or a portion of the face of the user) such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, a XR module 340, a 3D video capture unit 350, and a 3D video presentation unit 360.

The operating system 330 includes procedures for handling various basic system services and for performing hardware dependent tasks.

In some implementations, the XR module 340 is configured to create, edit, present, or experience XR environments. The XR module 340 is configured to present virtual content that will be used as part of XR environments for one or more users. For example, the user may view and otherwise experience a XR-based user interface that allows the user to select, place, move, and otherwise present a XR environment, for example, based on the virtual content location via hand gestures, voice commands, input device inputs, etc.

In some implementations, the 3D video capture unit 350 is configured to capture or generate 3D videos from a capture environment (e.g., a physical environment or XR environment). In some implementations, the 3D video capture unit 350 is configured to capture 3D videos independent of capture device movement, with actual size, or with determined relationships to positional references in the capture environment. In some implementations, various types of 3D videos (e.g., light field, photogrammetry, etc.) are captured.

In some implementations, the 3D video presentation unit 360 is configured to render obtained 3D videos in a replay environment (e.g., a physical or XR environment). In some implementations, the 3D video presentation unit 360 is configured to view 3D videos independent of the viewing device movement, based on at actual size, or with determined relationships to positional references in the replay environment. Although these modules and units are shown as residing on a single device (e.g., the controller 110), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Various implementations disclosed herein include devices, systems, and methods that generating a 3D video. In some implementations, adjustments (e.g., transforms) are determined to align content represented in the 3D video in a coordinate system to reduce effects of motion of sensors during the capturing of the content (e.g., a sequence of images and depth data) for the 3D video. For example, video frames of the 3D video may be aligned so that a static object (e.g., a couch) is at the same coordinates even though a camera used to create the 3D video moved from frame to frame. In some implementations, spatial relationships of content of the 3D video to positional references (e.g., ground plane) are determined when created and used to align content represented in the 3D video for later viewing (e.g., during playback in replay environments). In some implementations, the captured 3D video data includes actual scale information so that content represented in the 3D video during playback in replay environments may be presented based on actual size. In some implementations, static content and moving content are distinguished for video frames to facilitate creation of multiple spatially related 3D videos (e.g., wedding scenario). In some implementations, the 3D video may include images, depth data, spatialized audio, or capture device movements of a video-capture-device user.

In some implementations, initially a user captures 3D video data using a video capture device. The video capture device can be hand held, head mounted, remotely controlled, or the like. In some implementations, a generated 3D video from the captured 3D video data will have 360° of image and depth information so when the 3D video is replayed, the 3D video can be viewed in 3D from any perspective. In some implementations, the captured 3D video data includes actual scale information so that the replayed 3D video is scaled to the actual size of content contained therein.

In some implementations, the video-capture-device user capturing the 3D video is provided guidance during 3D video data recording. In some implementations, the guidance can include 3D video subject selection (e.g., automatic, manual, or manual confirmation), capture device motion assistance (e.g., subject in frame, subject out of frame, speed too fast, or speed too slow with text/visual cues to move), or 360° of views of subject (e.g., captured image/depth data for front, right and left sides, and back of the subject). In some implementations, the guidance can include directions to capture additional views, areas, or motions of the subject to reduce gaps in recorded information. In some implementations, the 3D video subject selection is determined based on distance, machine learning models, or the video-capture-device user can highlight to select or confirm the subject of the 3D video during recording. In some implementations, the guidance is provided without a specific subject being identified. In some implementations, the guidance is provided in a common display showing the video capture. In some implementations, the guidance is provided in a display window where the 3D video data being captured is shown as a 2D representation and the guidance information in viewable outside that window. In some implementations, the guidance or representation of the 3D video data being captured is provided in a XR environment. In some implementations, the guidance provided during a 3D video recording increases the chance of recording sufficient information to provide comprehensive 3D reproduction during playback.

In some implementations, when the 3D video data is being captured, processing of the 3D video is not being performed and occurs after the capture. In some implementations, processing the 3D video data starts during the 3D video data capture, but is completed after the 3D video data is captured.

In some implementations the processing includes a plurality of techniques. First, in some implementations, depth values are determined for every frame of every scene of the 3D video. In some implementations, multiple possible depth values are initially obtained for a frame from nearby frames or frames captured later in the 3D video data.

Second, in some implementations, for each frame, what is in motion and what is static is determined. This can include classifying objects or pixels representing objects in each frame that are dynamic (e.g., likely to move, such as people) or static (e.g., unlikely to move, such as walls, floors, tables, etc.). In some implementations, maps are created identifying static objects and objects in motion in each frame. In some implementations, static information can be accumulated over multiple frames. In some implementations, 3D point clouds are pre-determined to represent the static objects.

Third, in some implementations, the position and orientation of one or more capturing electronic devices (e.g., video-capture-device(s) or video camera) is determined throughout the recording of the 3D video data. In some implementations, data (e.g., metadata) about the capabilities of the capturing devices is recorded such as sensors, hardware, software applications, or additional stored data. In some implementations, additional data (e.g., metadata) about the capture conditions is recorded such as time of day, lighting, location, subject, input/output data, and additional characteristics about the physical environment involved in recording the 3D video data.

In some implementations, additional data is related to the placement of the 3D video in the physical environment (e.g., VIO, SLAM, segmentations) in which the 3D video data is being recorded. In some implementations, the placement information includes positional references in the 3D video data and the relative position of the subject of the 3D video to the positional references. In some implementations, the positional references include walls, ceiling, sky, planar objects, identified objects or static objects behind or around the subject in the physical environment. In some implementations, positional references like the ground plane or floor is determined and stored throughout the video frames or scenes in the recorded 3D video.

In some implementations, the spatial relationship of the 3D video (e.g., subject of the 3D video) to the positional reference when created is used to orient or pose the 3D video (or subject) in a replay environment (e.g., using a corresponding positional reference) for later viewing. For example, the actual size or spatial relationship of the 3D video to a ground plane of the physical environment in which it was captured (e.g., the surface on which the subject of the 3D video appears to be standing, a floor of a room) may be determined when the 3D video is created, and then the corresponding size or spatial relationship is mimicked with respect to a ground plane (e.g., floor of an office, football field, or similar surface on which the subject of the 3D video appears to be standing) in the environment in which it is replayed. Thus, in some implementations, the ground plane alignment between the 3D video subject in the physical environment during capture can be replicated for the rendered 3D video in the replay environment during viewing. In some implementations, the ground plane is at 90 degrees to a picture plane or a flat 2D surface on which a 2D/3D image is drawn or projected in perspective. In another example, a person is leaning against a wall of a room when captured as the subject in a 3D video, and then the leaning spatial relationship is mimicked with respect to an object (e.g., wall of an office, or similar surface against which the person of the 3D video may lean) in the replay environment.

Fourth, in some implementations, any virtual content or data (e.g., XR features) involved in the capture of the 3D video data or included in the 3D video data are determined and recorded.

Fifth, in some implementations, capturing device movement or motion during the capturing of the 3D video data is addressed. In some implementations, the motions of the capturing device is reduced or removed by aligning every frame to the same single 3D coordinate system. In some implementations, the motions of the capturing device is reduced or removed by determining adjustments (e.g., transforms) to reduce (e.g., eliminate) effects of motion during capturing of a sequence of images and depth data of the 3D video data. In some implementations, adjustments to reduce or eliminate capture device motion may be identified based on corresponding motion sensor data, based on image comparisons, or based on identifying one or more static objects and determining transforms based on the static objects.

Sixth, in some implementations, recorded 3D audio (e.g., surround sound or spatial audio) is modified for playback. For example, a full spatial audio array (e.g., microphones) can capture audio for all directions during the recording of the 3D video data. In some implementations, when processing the recorded 3D audio, a relationship to the subject is addressed and the audio data is spatialized. In some implementations, the audio is converted to spatial audio information and oriented to a position of the subject of the 3D video during playback. In some implementations, the spatialized audio is oriented to the single 3D coordinate system of the aligned video frames. For example, if during the 3D video recording, first audio is coming from a single direction from the subject while the capturing device is spinning 720°, the spatialized audio may be oriented to that single direction for playback while the 720° movement of the capturing device is ignored.

In some implementations, the information for each video frame may be aesthetically treated, for example, using computer vision techniques. In some implementations, the aesthetic treatment includes standard smoothing or filling procedures for missing data. However, in some implementations, alternative treatments for missing information in a video frame may be used. In some implementations, missing pixels or voxels may be displayed in 2-D or blurry for intervals of time or viewpoints, or the like. In some implementations, missing pixels or voxels may be determined from other images later in the recorded 3D video or even using additional images/videos of the subject of the 3D video stored in the capturing electronic device, processing electronic device, or coupled (e.g., remote) electronic device.

In some implementations, the captured 3D video is an incomplete representation (e.g., image data, depth data, or the like is missing from one or more viewpoints) of the subject or other objects in the 3D video content. In some implementations, the aesthetic treatment techniques may be used to address incomplete portions of content of the 3D video.

In some implementations, the plurality of processing techniques for the recorded 3D video data may be performed in any order and some of the plurality of processing techniques may be performed concurrently.

In some implementations, the 3D video is captured using a single video capturing device. In some implementations, the 3D video is captured using more than one video capturing device.

Finally, in some implementations, the processed captured 3D video data is stored for reproduction (e.g., playback). In some implementations, a plurality of files can be stored as the processed 3D video.

In some implementations, the 3D video is in a preset multimedia format. In some implementations, the preset multimedia format specifies file(s) that contains one or more tracks, each of which stores a particular type of data (e.g., audio, video, etc.). In some implementations, dynamic versus static information masks is one file or track of data. In some implementations, the preset format is a 3D video format type approved by an organization that develops standards for encoding multimedia such as digital audio and video. In some implementations, files for the 3D video can include RGB files or image files, depth maps with confidences, segmentation information, point cloud files for static reconstruction, video capture device (e.g., camera) metadata, time or location metadata, spatial audio, or the like.

In some implementations, the processed 3D video may be aligned with the real world environment during playback because the capture device movement has been removed, the determined ground plane (e.g., beach) in the processed 3D video is aligned with the ground plane (e.g., floor) in the real world during playback, or the played back subject is the actual size of the subject.

Figure 4:
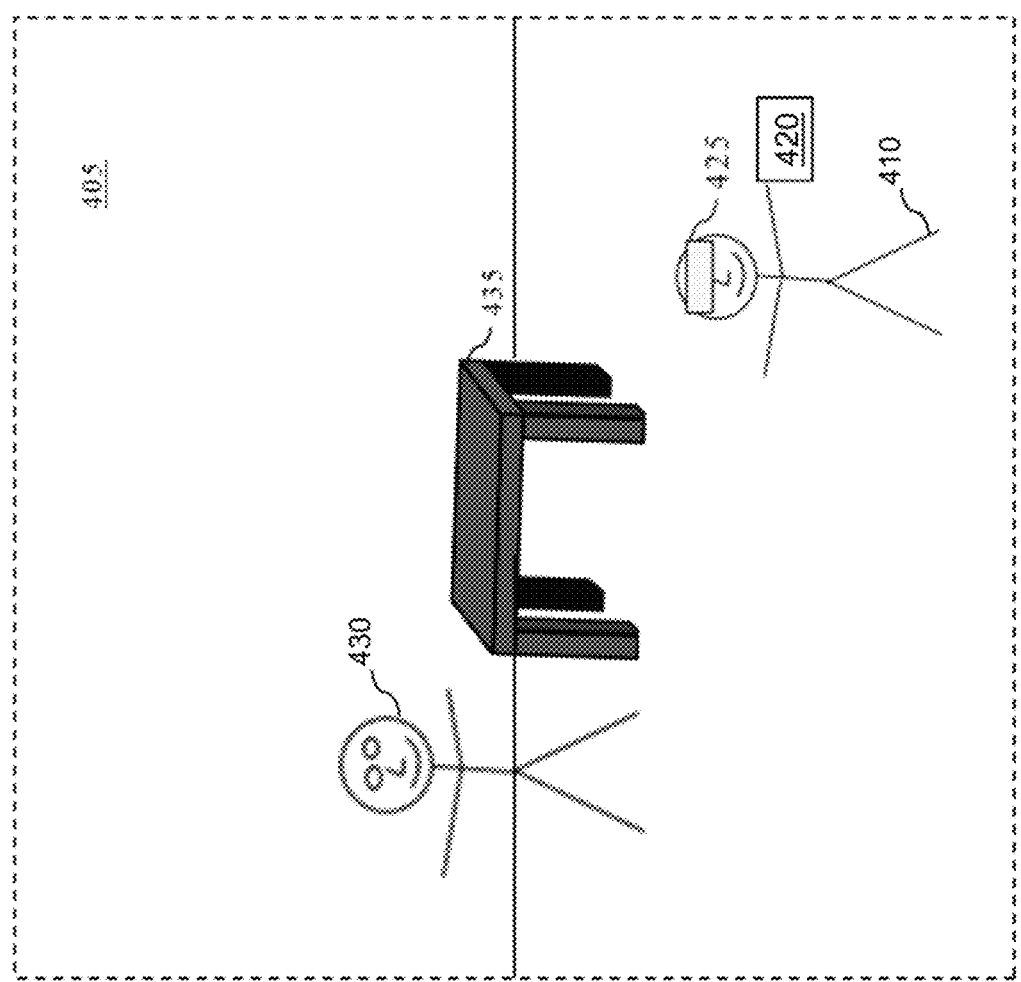
FIG. 4 is a block diagram showing an example environment.

Referring to FIG. 4, a physical environment 405 includes a first electronic device 420 or a second electronic device 425 being used by a first user 410. In this example, the environment 405 is a room that includes a person 430 and a table 435. The two devices 420, 425 can operate alone or interact with additional devices not shown to capture images of the environment, detect or track objects in those images, or to present XR content based on the images and the detected/tracked objects. Each of the two devices 420, 425 may communicate wirelessly or via a wired connection with a separate controller (not shown) to perform one or more of these functions. Similarly, each of the two devices 420, 425 may store information useful for a XR environment or may communicate with a separate device such as a server or other computing device that stores this information.

In some implementations, a device, such as second device 425, is a head-mounted device (HMD) such as XR glasses configured to present a XR environment when worn by the first user 410. In some implementations, a device, such as the first device 420 is a handheld electronic device (e.g., a smartphone or a tablet) configured to present the XR environment to the first user 410. The first device 420 and the second device 425 are each configured to use images or other real world information detected based on a camera(s) or other sensor(s) to provide the XR environment.

In some implementations, the first or second device 420, 425 enable the user 410 to change the viewpoint or otherwise modify or interact with the XR environment. In some implementations, the first or second device 420, 425 are configured to receive user input that interacts with displayed XR content. For example, a virtual object such as a 3D representation of a real world person or object, or informational displays each with interactive commands may be presented in the XR content. The first user 410 may reposition the virtual object or informational displays relative to the depicted real objects or interact with the interactive commands by providing user input on or otherwise using the respective device.

Figure 5:
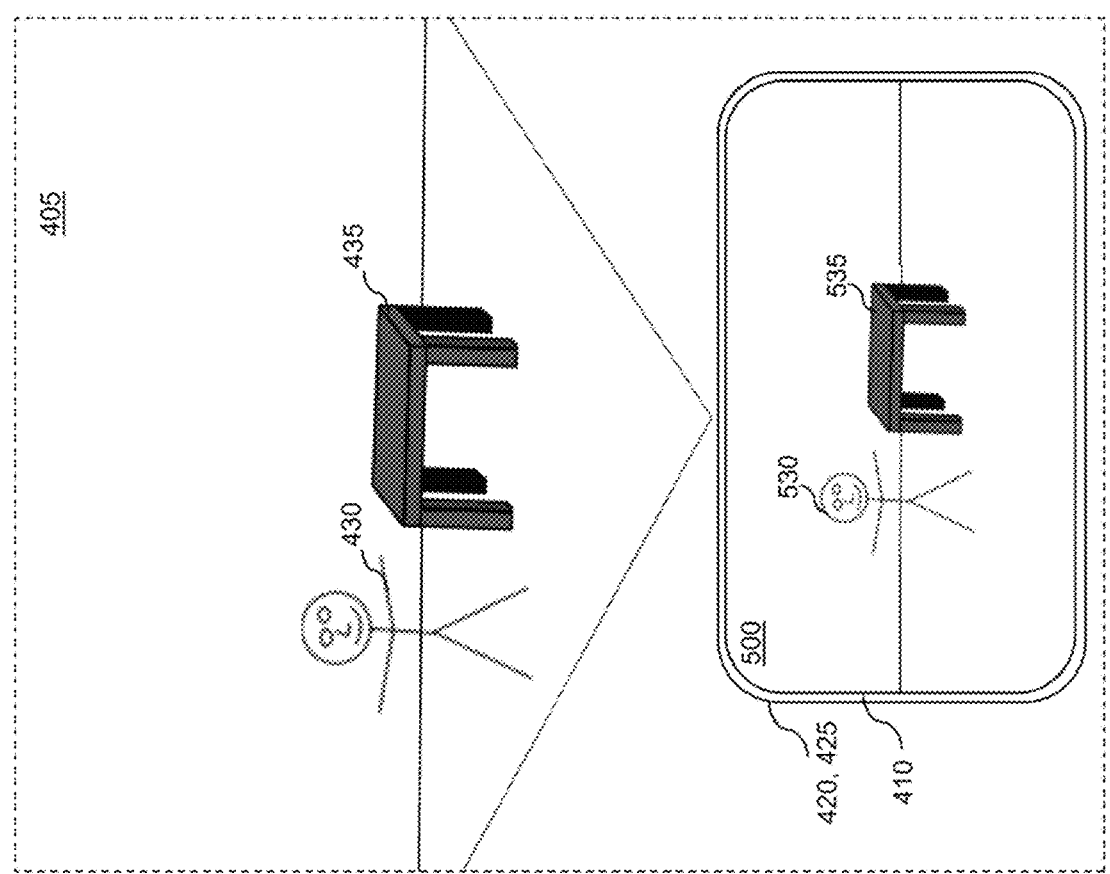
FIG. 5 is a block diagram showing an electronic device capturing a frame of a sequence of frames in the environment of FIG. 4 in accordance with some implementations.

FIG. 5 is a block diagram of the first or second device 420, 425 displaying a XR environment 500 based on the physical environment 405 of FIG. 4 in a display 410 in accordance with some implementations. The XR environment 500 may be generated from a frame of a sequence of frames captured by the first or second device 420, 425, for example, when executing an application in the physical environment 405. As shown in FIG. 5, the first or second device 420, 425 displays the XR environment 500 including a depiction 530 of the person 430 and a depiction 535 of the table 435. In some implementations, the XR environment 500 is a shared XR environment.

Figure 6:
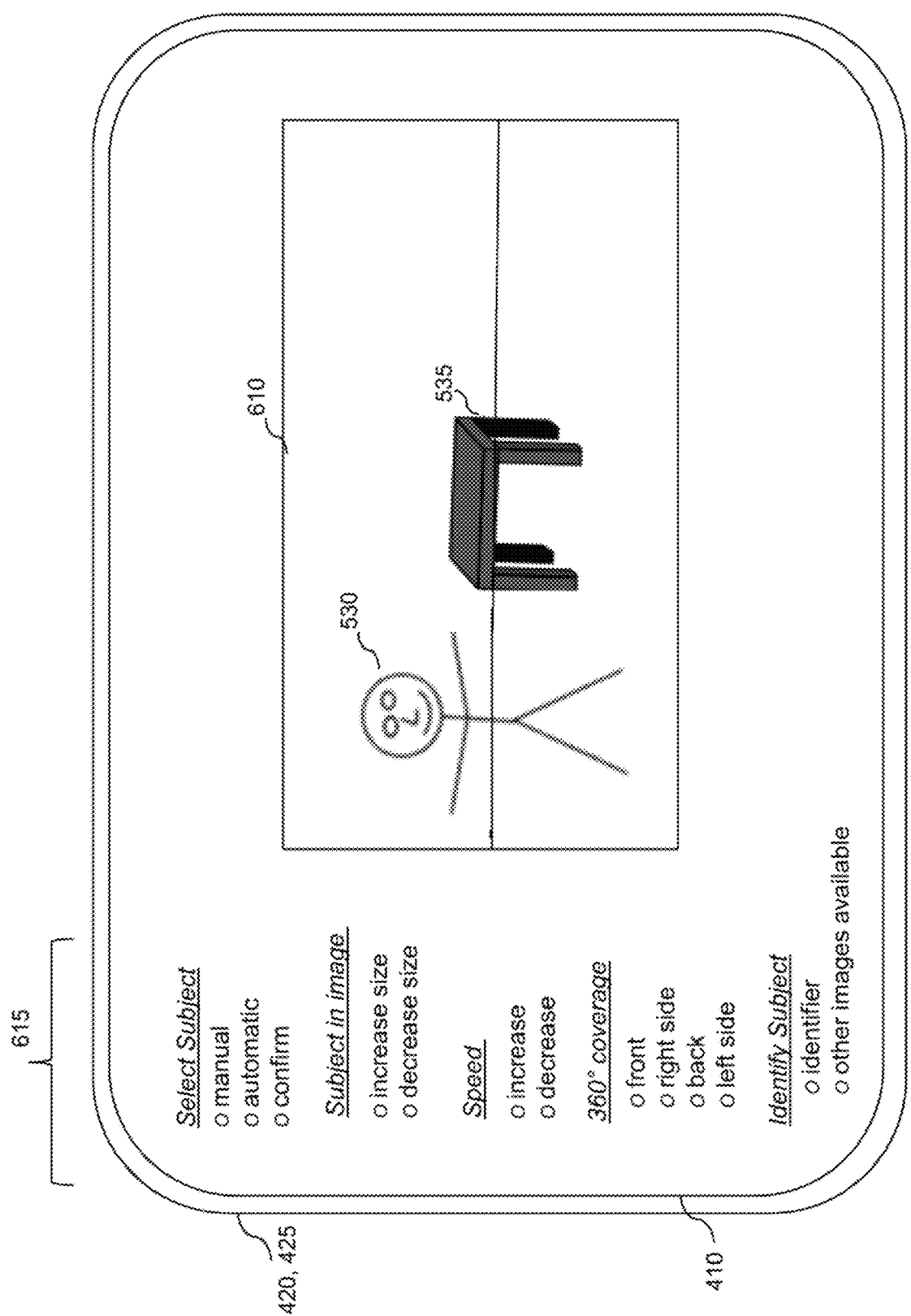
FIG. 6 is a block diagram of exemplary guidance information for capturing a 3D video in a physical environment at an electronic device in accordance with some implementations.

FIG. 6 is a block diagram of exemplary guidance information for capturing a 3D video in a physical environment at an electronic device in accordance with some implementations. As shown in FIG. 6, the display 410 of the first or second device 420, 425 displays a 2D representation of a portion of the XR environment 500. In some implementations, the 2D representation of a portion of the XR environment 500 is shown in a display 610 and exemplary interactive guidance information 615 is shown adjacent and corresponding to the display 610. As shown in FIG. 610, the depiction 530 of the person 430 may be the subject of the 3D video being captured (e.g., by the first or second device 420, 425).

Figure 7:
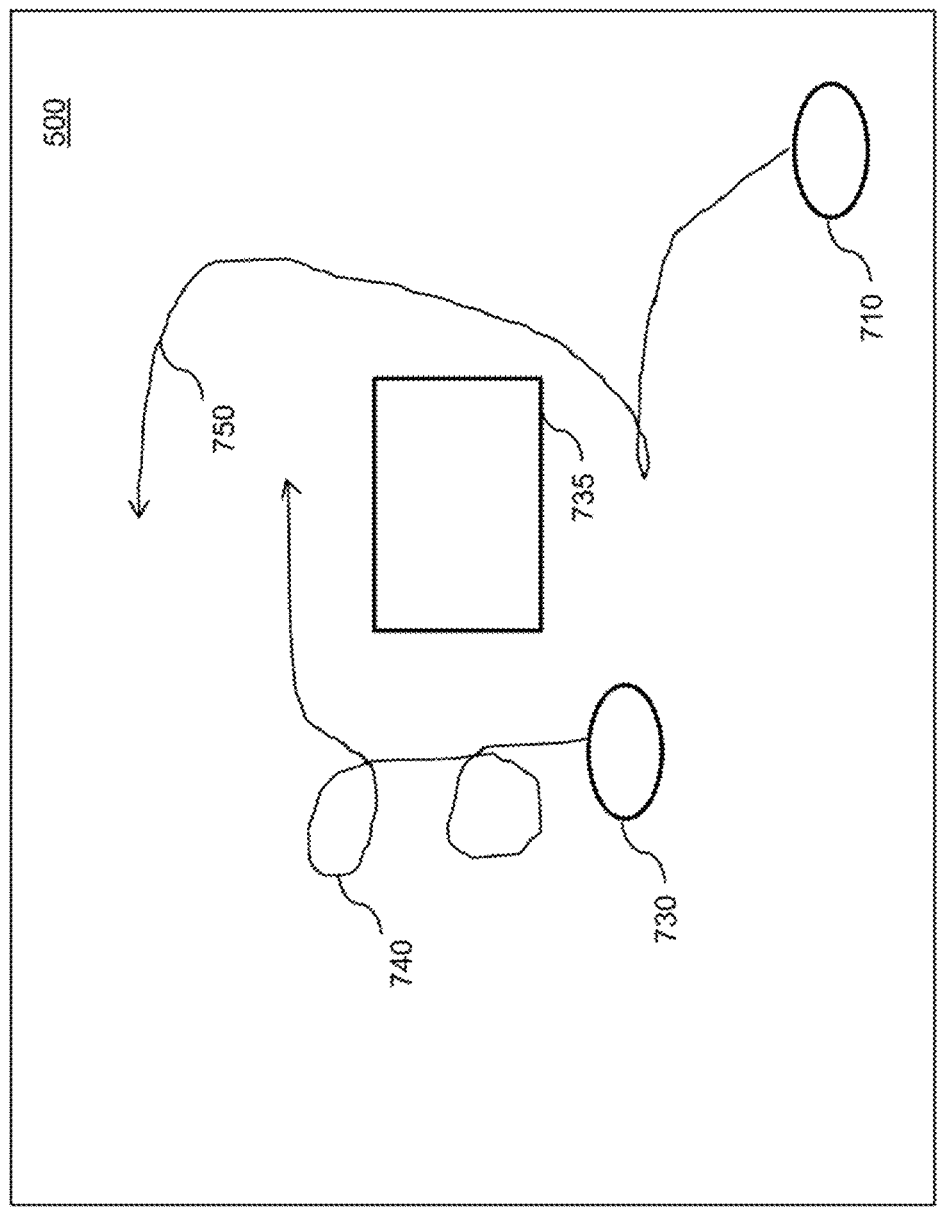
FIG. 7 is a block diagram of exemplary movement of a 3D video capture device when capturing 3D video data in accordance with some implementations.

FIG. 7 is a block diagram of exemplary movement of a 3D video capture device when capturing 3D video data in accordance with some implementations. FIG. 7 is a top-down view of the physical environment 405 or XR environment 500 during capture of 3D video data for generating a 3D video in accordance with some implementations. As shown in FIG. 7, a capture environment includes a depiction 730 of the person 430 and a depiction 735 of the table 435. In some implementations, the person 430 (depicted as representation 730) is the subject of the 3D video being captured by the first or second device 420, 425 (depicted as representation 710). As shown in FIG. 7, arrow 740 shows movement of the person 430 and arrow 750 shows movement of the capturing electronic device (e.g., first or second device 420, 425) during capture of 3D video data for the 3D video. In some implementations, the motions of the video capture device(s) are removed by aligning every frame to the same single 3D coordinate system. The motions 750 of the video capture device can be removed by determining adjustments (e.g., transforms) to reduce (e.g., eliminate) effects of motion during capture of the 3D video data for the 3D video of the person 430 in some implementations (e.g., see block 920 of FIG. 9).

In some implementations, once the processed 3D video is obtained, playback of the 3D video may be performed in a replay environment (e.g., a physical environment or XR environment). In some implementations, a preset multimedia format of the processed 3D video is determined. In some implementations, the preset multimedia format specifies file(s) that contains one or more tracks, each of which may store a particular type of data (e.g., audio, video, etc.), which is used to access and playback the individual tracks of information types as 3D video in a replay environment. In some implementations, meta-data stored with the processed 3D video is used to determine, access, and combine for playback information stored as the 3D video in a replay environment.

In some implementations, the processed 3D video includes a 3D coordinate system for a subject of or for the 3D video, actual sizes of the subject or additional objects in the 3D video, or positional references for placement of the subject or objects of the 3D video (e.g., ground plane, walls, ceiling, etc.) that align the content of the 3D video in the replay environment (e.g., ground plane of 3D video aligned to floor in XR while the subject is the correct size). In some implementations, the processed 3D video identifies a single coordinate system for the 3D video and provides spatialized audio relative to the single coordinate system.

In some implementations, a viewing electronic device is used to playback the processed 3D video in a replay environment. In some implementations, the viewing electronic device is used to watch the processed 3D video being played back in a shared replay environment by another playback electronic device.

In some implementations, the user of the viewing electronic device determines where (e.g., pose) in the replay environment to playback the processed 3D video. In some implementations, where (e.g., pose) to playback the processed 3D video in the replay environment is automatically determined. In some implementations, a selected pose in the replay environment to playback the processed 3D video is determined in semi-automatically. For example, the user of the viewing electronic device can confirm an initially selected pose in the replay environment to playback the processed 3D video.

In some implementations, the processed 3D video is played back in the replay environment using rendered 3D point clouds. Alternatively, in some implementations, other known rendering techniques are used.

In some implementations, once rendered, every pixel in a video frame is oriented (e.g., pushed back in space by amount based on the depth maps) to project and playback content of the 3D video in the replay environment at its actual size (e.g., size relative to actual or recorded size). In some implementations, the 3D video subject is played back at the same relative height by aligning the ground plane in the processed 3D video to the ground plane in the replay environment.

In some implementations during playback, second adjustments or viewing adjustments are continuously calculated and applied to address movements of the viewing electronic device around the replay environment (e.g., the real world in the XR environment) during playback of the processed 3D video. In some implementations, the viewing adjustments allow the processed 3D video being played back to remain stationary in the replay environment relative to the moving viewing electronic device. In some implementations, the viewing adjustments (e.g., second transform) counteract movement (e.g., reduces or eliminates motion) by the viewing electronic device so that the rendered 3D video stays fixed in real space as seen by the user at the viewing electronic device.

For example, in a video frame N1, 3D video content in a replay environment is displayed at a certain pose. Then, in a video frame N2, the 3D video content in the replay environment does not move. However, between the frame N1 and the frame N2, the user of the viewing electronic device (viewing the 3D video content in the replay environment) moves a first distance to the right and turns the viewing electronic device (e.g., the head of the user) 15° counterclockwise in a horizontal plane. In some implementations, the viewing adjustments (e.g., second transform) counters the physical displacement and angular horizontal displacement (e.g., movement between the frames N1 and N2 by the viewing electronic device) so that the rendered 3D video content in the replay environment stays fixed in the replay environment as seen by the user of the viewing electronic device (e.g., because the 3D video content did not move between frames N1 and N2).

Figure 8:
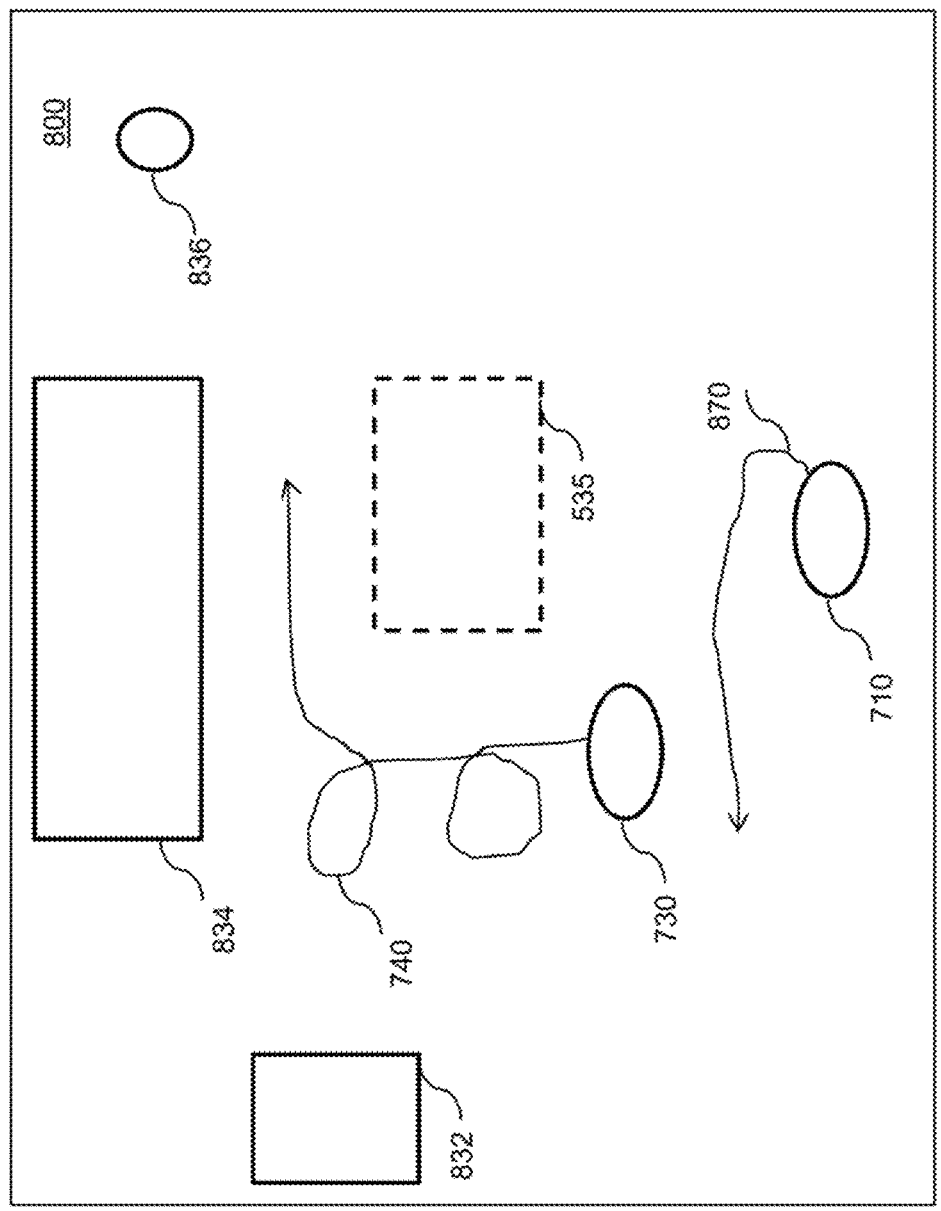
FIG. 8 is a block diagram of exemplary movement of a 3D video viewing electronic device around a replay environment during playback of an obtained 3D video in accordance with some implementations.

FIG. 8 is a block diagram of exemplary movement of a 3D video viewing electronic device around a replay environment (e.g., XR environment) during playback of a 3D video in accordance with some implementations. FIG. 8 is a top-down view of the replay environment 800 (e.g., a XR environment) that includes a representation of a chair 832, a representation of a couch 834, and a virtual lamp 836. In some implementations, the person 430 (depicted as representation 730) is the subject of the 3D video being played back by the first user 410 using the first or second device 420, 425 as the viewing electronic device for the replay environment 800. As shown in FIG. 8, the arrow 740 shows movement of the representation 730 of the person 430 and arrow 870 shows movement of the capturing user 410 or viewing electronic device (e.g., first or second device 420, 425) (depicted as representation 710) during playback of the 3D video of the person 430. In some implementations, the motions of the 3D video viewing electronic device(s) (e.g., first or second device 420, 425) are addressed by accounting for movement of the viewing electronic device during presentation of the 3D video of the person 430 in the replay environment. In some implementations, the second adjustments include one or more transforms that counter act or remove the movement of the viewing electronic device (e.g., first or second device 420, 425) relative to the 3D video during presentation of the 3D video in the replay environment. In some implementations, the 3D video also includes the depiction 735 of the table 435.

In some implementations, the 3D video includes multi-frame static objects. In some implementations, the static objects do not change throughout a block of video frames. In some implementations, predetermined point clouds (or other 3D representations) representing static objects are displayed, and dynamically generated point clouds for moving objects are generated in real time and displayed along with the static objects in the block of video frames. In some implementations, static objects are rendered and displayed once per block of video frames. For example, there could be 10 seconds of video frames where the static object is unchanged and dynamic video content is generated and updated in each frame of the 10 seconds of video frames.

In some implementations, lights or shadows within 3D video can affect the presentation of replay environment 800, lights or shadows within replay environment 800 can affect the presentation of 3D video, or both. This can be done to make 3D video appear as if it is actually within replay environment 800. For example, if the sun was directly overhead in the 3D video, the viewing electronic device can implement shadows for other real world objects and virtual objects in the replay environment that would be caused by the sun being directly overhead to match the shadows in the 3D video. In another example, the viewing electronic device can implement shadows for the subject of the 3D video that would be caused by the lamp 836 of the replay environment 800 to match the shadows of the furniture in the room of the replay environment 800. In some implementations, the lighting or shadowing affect can only be applied when a size of the 3D video in the replay environment 800 is greater than a threshold or when an intensity or other characteristic of the light or shadow of the 3D video is greater than a threshold. Similarly, in some implementations, the lighting or shadowing affect can only be applied to 3D video when a size of the light source or shadow in the replay environment 800 is greater than a threshold or when an intensity or other characteristic of the light or shadow of the replay environment 800 is greater than a threshold.

In some implementations, the 3D video is initially played back with a buffering outline (e.g., transition) between the played back 3D video content and the remainder of the replay environment. In some implementations, the buffering outline is a percentage of the size of the 3D video being played back. In some implementations, the buffering outline is a fixed spatial size such as 6 inches, 1 foot, or 4 feet. In some implementations, the buffering outline is removed over time.

In some implementations, the 3D video being played back becomes more immersive over time. In some implementations, just the subject of the 3D video is initially played back. In some implementations, a background of the 3D video is added so the remaining replay environment becomes more and more overcome by the played back 3D video. For example, sounds included in 3D video are initially barely audible when played back to the user of the viewing electronic device, but over time, the sounds included in 3D video almost completely mask the audio in the remaining replay environment. In a second example, the 3D video is of a soccer player dribbling in a 10' by 10' area of a field in front of rows of seats in front a stadium under a sunny sky. In this second example implementation, just the soccer player of the 3D video is initially played back in front of a couch in a replay environment of an interior room in a house. Over time, in this second example, the field is shown in the replay environment, the couch is replaced by the rows of seats, a wall behind the couch and walls to either side of the couch are replaced with the stadium, and then the ceiling is replaced with the open sky (and corresponding lighting effects). Thus, in the second example, the user of the viewing electronic device still sees some limited portion of the interior room adjacent the user of the viewing electronic device in the replay environment, but the accumulated overall effect is of immersion into the 3D video.

In some implementations, a starting position for the 3D video in the replay environment is determined and the 3D video is re-mapped back to the starting position when the 3D video moves beyond a preset spatial threshold distance from the starting position in the replay environment. In some implementations, the starting position for the 3D video in the replay environment is determined relative to the viewing electronic device, and the 3D video is re-mapped back to the starting position when the 3D video moves beyond a preset spatial threshold distance from the starting position in the replay environment. For example, if the 3D video is of a person moving through 10 rooms in a house, and a starting position of the played back 3D video is 15 feet in front of user of the viewing electronic device who remains motionless, each time the person of the 3D video becomes 30' away from the user of the viewing electronic device, the person of the 3D video is virtually returned to the starting position. Alternatively, the 3D video may be re-rendered based on context or the like. For a second example, each time the person of the 3D video moves to a different room of the house in the 3D video, then the person of the 3D video is virtually returned to the starting position. In another example, the played back 3D video is of the subject person walking down the street, and during playback, the subject person is periodically re-oriented to the viewing electronic device.

In some implementations, multiple (e.g., 4) 3D videos are captured as described herein in a single physical environment or related physical environments. In some implementations, capture adjustments accounting for movement of capturing devices that captured the multiple (e.g., 4) 3D videos are determined and used to generate 3D videos that are independent of movements of associated capturing devices. For example, the multiple (e.g., 4) 3D videos are temporally related and are of a child playing at a seesaw, swings, a sandbox, and a slide in a playground. In some implementations, the capturing device is the same capturing device for all of the multiple (e.g., 4) 3D videos.

In some implementations, the multiple (e.g., 4) 3D videos are processed as described herein and during playback, recorded metadata, recorded corresponding static objects, spatial relationships between single 3D coordinate system of each of the multiple (e.g., 4) 3D videos, actual size and independence of capture device motion, or the like allow the viewing electronic device to play back the multiple processed (e.g., 4) 3D videos in a single replay environment. In some implementations, the viewing electronic device plays back the multiple (e.g., 4) 3D videos individually in a sequential order in the single replay environment. In some implementations, the viewing electronic device plays back the multiple (e.g., 4) 3D videos together in the single replay environment.

In some implementations, re-localizing the multiple (e.g., 4) 3D videos in a single environment by the viewing electronic device in the replay environment may be used to tell the story of the child in the playground over time. In some implementations, re-localizing the multiple (e.g., 4) 3D videos in a single environment by the viewing electronic device in the XR environment may be used to tell how the physical environment evolved over time. In some implementations, the multiple (e.g., 4) 3D videos are captured as described herein, but at prescribed intervals of time (e.g., yearly).

In some implementations, a representation of a video-capture-device user can be captured at the same time as the 3D video. In some implementations, in addition to the subject of the 3D video being captured by a video capture device, the facial position, head (e.g., facial expression), or hands position of the video-capture-device user is also recorded by another video capture device and two 3D videos are generated. In some implementations, in addition to the subject of the 3D video being captured, audio of the video-capture-device user is also recorded. In some implementations, the played back 3D video of the subject and the played back 3D video of the video-capture-device user may be spatially oriented with respect to each other for the viewing electronic device. Accordingly, during playback the user of the viewing electronic device is able to see the played back 3D video of the subject and the played back 3D video of the video-capture-device user (e.g., facial expression or audible expression) are watched by the user of the viewing electronic device.

In some implementations, the video-capture-device user is re-played as captured (e.g., raw data). In some implementations, the video-capture-device user is played back as an avatar or used to drive an avatar. For example, a parent could generate a 3D video of their child eating a meal, opening presents, or playing in a sports event and the facial expression of the parent can be played back with (e.g., spatially related, nearby, or within) the processed 3D video of the child.

In some implementations, an operating system and additional applications of the capture electronic device and the viewing electronic device are the same.

In some implementations, the 3D video is depicted on or inside virtual objects or representations of physical objects in the XR environment.

Figure 9:
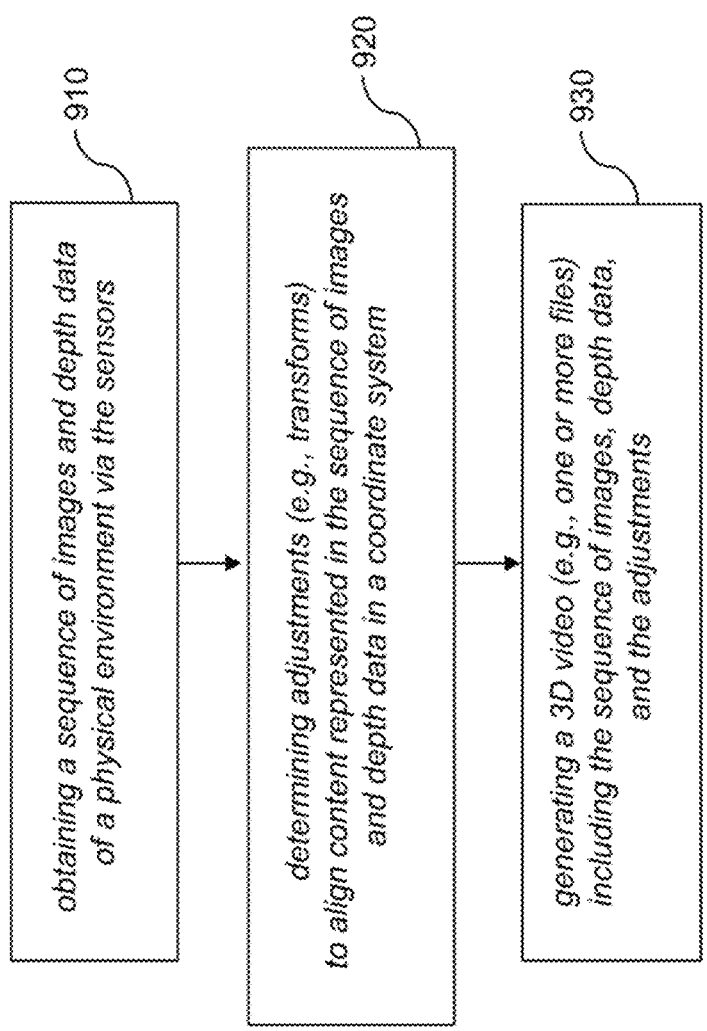
FIG. 9 is a flowchart illustrating an exemplary method of generating a 3D video according to some implementations.

FIG. 9 is a flowchart illustrating an exemplary method of generating a 3D video according to some implementations. In some implementations, adjustments (e.g., transforms) are determined to align content represented in the 3D video in a coordinate system to reduce effects of motion of sensors during the capturing of the content (e.g., a sequence of images and depth data) for the 3D video. For example, video frames of the 3D video may be aligned so that a static object (e.g., a couch) is at the same coordinates even though a camera used to create the 3D video moved from frame to frame. In some implementations, the 3D video may include images/audio of the video-capture-device user. In some implementations, the method 900 is performed by an electronic device (e.g., controller 110 or electronic device 120 of FIGS. 1-3). The method 900 can be performed at a mobile device, HMD, desktop, laptop, server device, or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 obtains a sequence of images and depth data of a physical environment via sensors. In some implementations, one or more RGB images and one or more depth images are captured for each frame. In some implementations, motion data corresponding to motion of the sensors during the capturing may also be recorded.

At block 920, the method 900 determines adjustments (e.g., transforms) to align content represented in the sequence of images and depth data in a coordinate system. Such adjustments may be based on movement of the sensors, e.g., changing of the spacing between sensors rather than static offsets between sensors. In some implementations, the adjustments reduce (e.g., eliminate) effects of motion of the sensors during capturing of the sequence of images and depth data by the sensors. In some implementations, adjustments to reduce or eliminate capture sensor motion may be identified based on motion sensor data. In some implementations, adjustments to eliminate capture sensor motion may be identified based on image comparisons. In some implementations, the adjustments to eliminate the capture device motion may be determined by identifying one or more static objects and determining transforms based on the static objects. In some implementations, the adjustments to reduce the capture device motion enables playback of a 3D video in which the video content can be spatially aligned to a single 3D coordinate system. In some implementations, the content alignment and the adjustments to eliminate the capture device motion enables playback of a 3D video in which the video content can be aligned with the physical environment (e.g., ground plane) in a XR environment.

At block 930, the method 900 generates a 3D video (e.g., one or more files) including the sequence of images, the depth data, and the adjustments. In some implementations, the 3D video includes one or more separate but coordinated files. In some implementations, the 3D video file may include RGB images, depth maps, confidences, segmentations, point cloud files for static reconstruction, image capture device (e.g., camera) metadata, or spatial audio data.

In some implementations, the 3D video is in a preset format. In some implementations, the preset format specifies a multimedia container file that contains one or more tracks, each of which stores a particular type of data (e.g., audio, video, or text (e.g., for subtitles)). In some implementations, each track either contains a digitally-encoded media stream (using a specific format) or a data reference to the media stream located in another file. In some implementations, tracks are maintained in a hierarchical data structure consisting of objects. In some implementations, the preset format is video format type approved by an organization that develops standards for encoding digital audio and video.

In some implementations, at block 910 the method 900 captures sequence of images and depth data or sequential audio inputs and spatial data of a video-capture-device user of a physical environment via additional sensors. In some implementations, adjustments (e.g., transforms) are determined to align content of the video-capture-device user represented in a video-capture-device user 3D video in a single coordinate system to reduce effects of motion of sensors during the capturing of the content (e.g., a sequence of images and depth data) for the 3D video of the video-capture-device user. In some implementations, at block 930 the method 900 generates a video-capture-device user 3D video (e.g., one or more files) including the sequence of images, the depth data, and the adjustments.

In some implementations, the 3D video is played back in a XR environment by a second electronic device (e.g., viewing device) and second adjustments (e.g., second transforms) are determined to account for movement of the second electronic device during presentation of the 3D video in the XR environment. In some implementations, the 3D video is stationary in the XR environment relative to the viewing device. In some implementations, the 3D video is stationary in the XR environment to the viewing device based on the adjustments (e.g., see block 920) and the second adjustments.

In some implementations, the 3D video includes multi-frame static reconstructions, wherein a point cloud is generated for static reconstructions representing static objects identified in the sequence of images of the physical environment. In some implementations, the static reconstructions do not change throughout a block of video frames. In some implementations, the static reconstructions are used to reduce holes in the aligned content of the 3D video. In some implementations, the static reconstructions may fill in holes, for example, behind dynamically moving objects in the 3D video.

In some implementations, the static reconstructions are used to expand content in at least one of the sequence of frames or images of the 3D video. In some implementations, the static reconstructions increasingly immerse the user of the viewer device in the 3D video. For example, the static reconstruction may expand aligned content, for example, filling in a house and yard behind a person standing in their back yard, where the person is the subject and moving object in the 3D video.

In some implementations, multiple 3D videos are captured in a single physical environment or related physical environments. In some implementations, the multiple 3D videos may be spatially oriented in a combined coordinated playback in a XR environment. For example, in a wedding reception, a cake cutting, a first dance, a maid of honor toast, or best man's toast may take place in different parts of a single room. In some implementations, capturing multiple related 3D videos (e.g., context or physically related) allows playback in the XR environment to show 3D videos in ordered sequence configured to provide related changes of a place (e.g., wedding reception room) or subject (e.g., child). In some implementations, related 3D videos (e.g., wedding videos) in the XR environment tell the story of a location (e.g., the reception) over time.

In some implementations, the multiple 3D videos include a subject of the 3D video and a 3D video of the video-capture-device user.

In some implementations, a second 3D video is generated including a second sequence of images, second depth data, and second adjustments that align second content represented in the second sequence of images and the second depth data of the physical environment in a second coordinate system to reduce effects of motion of the second sensors during capturing by second sensors. In one implementation, the 3D video includes static reconstructions representing static objects in of the physical environment, the second 3D video includes second static reconstructions representing static objects in the physical environment, and a spatial relationship between the static reconstructions and the second static reconstructions provides spatially related playback of the 3D video and the second 3D video in a XR environment. In some implementations, a spatial relationship between the first coordinate system of the 3D video and second coordinate system of the second 3D video provides spatially related playback of the 3D video and the second 3D video in a XR environment. In some implementations, physical environment of the second 3D video is different than the physical environment of the 3D video. In some implementations, physical environment of the second 3D video is overlaps or is the same as the physical environment of the 3D video.

In some implementations, the 3D video generates one or more files including segmentations, such as static object and moving object segmentation, object type segmentation, or semantic segmentation. In some implementations, the 3D video generates one or more files including camera data, time data, data representing the physical environment, spatialized audio data, or lighting data.

Figure 10:
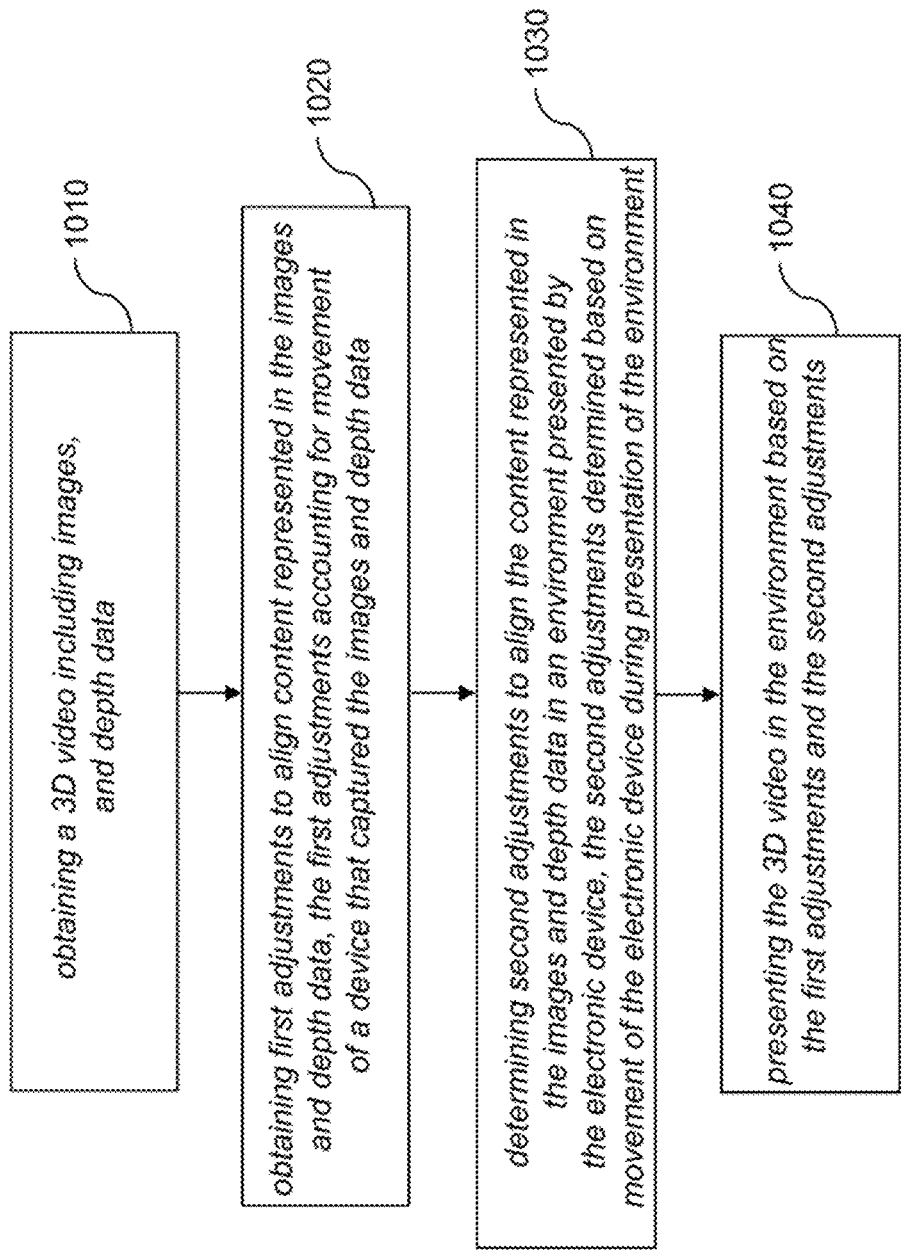
FIG. 10 is a flowchart illustrating an exemplary method of playback of a 3D video according to some implementations.

FIG. 10 is a flowchart illustrating an exemplary method of playback of a 3D video according to some implementations. In some implementations, first adjustments (e.g., transforms) are determined to align content represented in the 3D video in a coordinate system to reduce effects of motion of sensors during the capturing of the content (e.g., capturing a sequence of images and depth data) for the 3D video. For example, video frames of the 3D video may be aligned so that a static object (e.g., a couch) is at the same coordinates even though a camera used to create the 3D video moved from frame to frame. In some implementations, second adjustments (e.g., second transforms) are determined to remove the effects of movement of a viewing electronic device relative to the 3D video during playback. In some implementations, the 3D video may include images/audio of the video-capture-device user. In some implementations, the method 1000 is performed by an electronic device (e.g., controller 110 or electronic device 120 of FIGS. 1-3). The method 1000 can be performed at a mobile device, HMD, desktop, laptop, server device, or by multiple devices in communication with one another. In some implementations, the method 1000 is performed by processing logic, including hardware, firmware, software, or a combination thereof. In some implementations, the method 1000 is performed by a processor executing code stored in a non-transitory computer-readable medium (e.g., a memory).

At block 1010, the method 1000 obtains a 3D video including images and depth data. In some implementations, the 3D video includes sensor metadata. In some implementations, a 3D video includes files for RGB images, depth maps, confidences, segmentations, point cloud files for static reconstruction, camera metadata, spatial audio, or images/audio of a video-capture-device user.

At block 1020, the method 1000 obtains first adjustments (e.g., first transforms) to align content represented in the images and depth data, the first adjustments accounting for movement of a device that captured the images and the depth data. In some implementations, the first adjustments are transforms identified based on motion sensor data for the capturing device, based on image data comparisons, or based on identifying one or more static objects and determining the first adjustments based on the static objects.

At block 1030, the method 1000 determines second adjustments (e.g., second transforms) to align the content represented in the images and depth data in an environment presented by the electronic device, the second adjustments determined based on movement of the electronic device during presentation of the environment. In some implementations, the environment is a XR environment. In some implementations, the second adjustments include one or more transforms that remove the movement of the viewing device relative to the 3D video during presentation of the 3D video in the XR environment.

At block 1040, the method 1000 presents (e.g., providing visual depictions and/or audio) the 3D video in the environment based on the first adjustments and the second adjustments. In some implementations, the method 1000 provides visual depictions or audio representations as the 3D video in the environment. In some implementations, the playback of the 3D video includes playback of a video-capture-device user including spatialized audio of the video-capture-device user.

In some implementations, the 3D video generates one or more files including segmentations, wherein the segmentations include static object and moving object segmentations. In some implementations, the static objects are removed from the playback of the 3D video in the XR environment.

In some implementations, lighting or shadowing of the 3D video affects the XR environment based on relative size or relative light sources. In some implementations, the lighting or the shadowing of the XR environment affects the 3D video based on relative size or relative light sources.

In some implementations, the spatial relationship of the 3D video to a positional reference in the physical environment during capture can be replicated for the rendered 3D video in the XR environment during viewing. In some implementations, the 3D video identifies a ground plane within the 3D video, and during playback of the 3D video in the XR environment the ground plane of the 3D video is aligned to a ground plane of the XR environment. In some implementations, the 3D video identifies a single coordinate system for the 3D video and provides spatialized audio relative to the single coordinate system. In some implementations, a starting position for the 3D video in the XR environment is determined and the 3D video is re-mapped back to the starting position when the 3D video moves beyond a preset spatial threshold distance from the starting position in the XR environment. In some implementations, the starting position for the 3D video in the XR environment is determined relative to the viewing device, and the 3D video is re-mapped back to the starting position when the 3D video moves beyond a preset spatial threshold distance from the starting position in the XR environment.

In some implementations, a second 3D video is obtained including second images, second depth data, and second sensor metadata. In some implementations, capture adjustments accounting for movement of a second capturing device that captured the second 3D video are determined to align second content represented in the second images and the second depth data and viewing adjustments accounting for movement of a second viewing electronic device during presentation of the XR environment are determined. Then, the second 3D video is played back in the XR environment based on the second capture adjustments and the second playback adjustments. In some implementations, the second 3D video is captured in the same physical environment or a spatially related physical environment as the 3D video. In some implementations, the 3D video includes static reconstructions representing static objects in the physical environment and the second 3D video includes second static reconstructions representing static objects in the physical environment, and a spatial relationship between the 3D video and the second 3D video in the XR environment is based on the static reconstructions and the second static reconstructions. In some implementations, the second capturing device is the capturing device, or the second viewing device is the viewing device.

In some implementations, one electronic device operates as the capture electronic device or the viewing electronic device. In some implementations, multiple electronic devices (e.g., local electronic device and remote electronic device (e.g., server)) operate as the capture electronic device or the viewing electronic device. In some implementations, the viewing electronic device provides the XR environment. In some implementations, the XR environment is a shared XR environment. In some implementations, another electronic device provides the XR environment viewed by the viewing electronic device.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel. In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein are implemented on an electronic device including a processor.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor and sensors:
        obtaining a sequence of images and depth data of a physical environment via the sensors;
        determining, based on movement of the sensors, adjustments to align content represented in the sequence of images and depth data in a coordinate system; and
        generating a 3D video comprising the sequence of images, depth data, and the adjustments.

2. The method of claim 1, wherein the adjustments comprise one or more transforms to align RGB data of each image and the depth data in a single coordinate system.

3. The method of claim 1, wherein the adjustments comprise one or more transforms based on motion sensor data corresponding to movement of the sensors that generated the sequence of images and the depth data of the physical environment.

4. The method of claim 1, wherein the adjustments comprise one or more transforms based on at least one static object data identified in the sequence of images and the depth data of the physical environment.

5. The method of claim 1, wherein the 3D video comprises multi-frame static reconstructions, wherein a point cloud is generated for static reconstructions representing static objects identified in the sequence of images of the physical environment.

6. The method of claim 1, wherein the 3D video comprises static reconstructions representing static objects identified in the sequence of images of the physical environment.

7. The method of claim 1, wherein the 3D video comprises static reconstructions representing static objects identified in the sequence of images of the physical environment, and wherein the static reconstructions are used to expand content in at least one of the sequence of images of the 3D video.

8. The method of claim 1, further comprising:
    obtaining a second sequence of images and second depth data of a second physical environment via second sensors, where the second physical environment is spatially related to the physical environment;
    determining second adjustments to align content represented in the second sequence of images and second depth data in a second coordinate system; and
    generating a second 3D video comprising the second sequence of images, second depth data, and the second adjustments,
    wherein the 3D video comprises static reconstructions representing static objects in the physical environment, and wherein the second 3D video comprises second static reconstructions representing second static objects in the second physical environment.

9. The method of claim 8, further comprising determining a spatial relationship between the first coordinate system and the second coordinate system based on the static reconstructions and the second static reconstructions.

10. The method of claim 8, wherein the second sensors are the same as the sensors.

11. The method of claim 8, wherein the second sensors are different than the sensors.

12. The method of claim 8, wherein the second physical environment is the first physical environment.

13. The method of claim 1, further comprising:
    determining third adjustments accounting for movement of a second electronic device during presentation of the 3D video in an environment; and
    presenting the 3D video in the environment on the second electronic device based on the third adjustments.

14. The method of claim 1, wherein the environment is a XR environment.

15. The method of claim 1, wherein generating the 3D video comprises generating one or more files including segmentations, and wherein the segmentations include static object and moving object identifications, object type segmentation, or semantic segmentation.

16. The method of claim 1, wherein generating the 3D video comprises generating one or more files including camera data, time data, data representing the physical environment, or lighting data.

17. The method of claim 1, wherein generating the 3D video comprises generating one or more files including spatialized audio data.

18. The method of claim 1, wherein generating the 3D video comprises generating one or more files including a sequence of images and depth data of a user of the electronic device or a sequence of audio inputs and orientation data of the user of the electronic device that were obtained while the electronic device obtained the sequence of images and the depth data of the physical environment.

19. The method of claim 1, wherein:
the sequence of images and depth data comprise images and depth data corresponding to an object at a static position within the physical environment during at least a portion of the sequence of images and depth data; and
the adjustments are used to adjust positioning of 3D video content within a viewing environment during playback of the 3D video so that the object that was at the static position in the physical environment appears at a static position within the viewing environment.

20. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
 obtaining a sequence of images and depth data of a physical environment via sensors;
 determining, based on movement of the sensors, adjustments to align content represented in the sequence of images and depth data in a coordinate system; and
 generating a 3D video comprising the sequence of images, depth data, and the adjustments.

21. A non-transitory computer-readable storage medium, storing program instructions computer-executable on a computer to perform operations comprising:
at an electronic device having a processor and sensors:
 obtaining a sequence of images and depth data of a physical environment via the sensors;
 determining, based on movement of the sensors, adjustments to align content represented in the sequence of images and depth data in a coordinate system; and
 generating a 3D video comprising the sequence of images, depth data, and the adjustments.

\* \* \* \* \*